United States Patent
Marsala et al.

(10) Patent No.: US 12,000,277 B2
(45) Date of Patent: *Jun. 4, 2024

(54) WATER DETECTION FOR GEOSTEERING IN DIRECTIONAL DRILLING

(71) Applicants: Saudi Arabian Oil Company, Dhahran (SA); Openfield Technology, Versailles (FR)

(72) Inventors: Alberto F. Marsala, Dhahran (SA); Eric Donzier, Versailles (FR)

(73) Assignees: Saudi Arabian Oil Company, Dhahran (SA); Openfield Technology, Versailles (FR)

( * ) Notice: Subject to any disclaimer, the term of this patent is extended or adjusted under 35 U.S.C. 154(b) by 354 days.

This patent is subject to a terminal disclaimer.

(21) Appl. No.: 17/290,051

(22) PCT Filed: May 26, 2020

(86) PCT No.: PCT/IB2020/000529
§ 371 (c)(1),
(2) Date: Apr. 29, 2021

(87) PCT Pub. No.: WO2021/240196
PCT Pub. Date: Dec. 2, 2021

(65) Prior Publication Data
US 2022/0307372 A1 Sep. 29, 2022

(51) Int. Cl.
*E21B 49/08* (2006.01)
*E21B 7/04* (2006.01)
(Continued)

(52) U.S. Cl.
CPC .............. *E21B 49/087* (2013.01); *E21B 7/04* (2013.01); *E21B 21/085* (2020.05); *E21B 44/00* (2013.01);
(Continued)

(58) Field of Classification Search
CPC ...... E21B 49/087; E21B 21/085; E21B 47/07; E21B 7/04; E21B 44/00; E21B 47/10; E21B 2200/20; E21B 47/13; E21B 47/26
See application file for complete search history.

(56) References Cited

U.S. PATENT DOCUMENTS 3,292,143 A 12/1966 Russell
4,676,313 A 6/1987 Rinaldi
(Continued)

FOREIGN PATENT DOCUMENTS

CA 2851237 5/2013
CA 2856274 3/2016
(Continued)

OTHER PUBLICATIONS

PCT International Search Report and Written Opinion in International Appln. No. PCT/IB2020/000529, dated Feb. 24, 2021, 14 pages.
(Continued)

*Primary Examiner* — Dany E Akakpo
(74) *Attorney, Agent, or Firm* — Fish & Richardson P.C.

(57) ABSTRACT

Systems and methods are provided for geosteering in directional drilling based on water detection. An exemplary method includes determining a signal-to-noise ratio (SNR) for an electromagnetic communication between devices on a bottom hole assembly, and determining a distance to water based, at least in part, on the SNR. Adjustments to geosteering vectors for the bottom hole assembly are determined based, at least in part, on the distance to water.

25 Claims, 6 Drawing Sheets

(51) Int. Cl.
*E21B 21/08* (2006.01)
*E21B 44/00* (2006.01)
*E21B 47/07* (2012.01)
*E21B 47/10* (2012.01)
*E21B 47/13* (2012.01)
*E21B 47/26* (2012.01)

(52) U.S. Cl.
CPC .............. *E21B 47/07* (2020.05); *E21B 47/10* (2013.01); *E21B 47/13* (2020.05); *E21B 47/26* (2020.05); *E21B 2200/20* (2020.05)

(56) References Cited

U.S. PATENT DOCUMENTS

| | | |
|---|---|---|
| 5,128,901 A | 7/1992 | Drumheller |
| 5,151,658 A | 9/1992 | Muramatsu et al. |
| 5,176,207 A | 1/1993 | Keller |
| 5,753,812 A | 5/1998 | Aron |
| 5,854,991 A | 12/1998 | Gupta et al. |
| 5,876,645 A | 3/1999 | Johnson |
| 5,877,995 A | 3/1999 | Thompson |
| 5,886,303 A | 3/1999 | Rodney |
| 6,026,900 A | 2/2000 | Keller |
| 6,283,209 B1 | 9/2001 | Keller |
| 6,739,165 B1 | 5/2004 | Strack |
| 6,740,141 B2 | 5/2004 | Espin et al. |
| 7,093,672 B2 | 8/2006 | Seydoux et al. |
| 7,376,517 B2 | 5/2008 | Rickett |
| 7,595,737 B2 | 9/2009 | Fink et al. |
| 7,721,803 B2 | 5/2010 | Huang et al. |
| 7,913,806 B2 | 3/2011 | Pabon |
| 7,937,222 B2 | 5/2011 | Donadille et al. |
| 7,991,555 B2 | 8/2011 | Yang et al. |
| 8,069,913 B2 | 12/2011 | Coste |
| 8,090,538 B2 | 1/2012 | Wilkinson et al. |
| 8,101,907 B2 | 1/2012 | Jacobi et al. |
| 8,168,570 B2 | 5/2012 | Barron et al. |
| 8,215,384 B2 | 7/2012 | Trinh |
| 8,230,918 B2 | 7/2012 | Ameen |
| 8,253,417 B2 | 8/2012 | Pislak et al. |
| 8,269,501 B2 | 9/2012 | Schmidt et al. |
| 8,347,985 B2 | 1/2013 | Bittar |
| 8,424,377 B2 | 4/2013 | Keller |
| 8,627,902 B2 | 1/2014 | Hammer |
| 8,664,586 B2 | 3/2014 | Schmidt |
| 8,680,866 B2 | 3/2014 | Marsala et al. |
| 8,714,246 B2 | 5/2014 | Pop et al. |
| 8,726,983 B2 | 5/2014 | Khan |
| 8,803,077 B2 | 8/2014 | Schmidt |
| 8,812,237 B2 | 8/2014 | Wilt et al. |
| 8,931,347 B2 | 1/2015 | Donzier et al. |
| 8,976,625 B2 | 3/2015 | Bilas |
| 8,997,868 B2 | 4/2015 | Nguyen et al. |
| 9,002,649 B2 | 4/2015 | Bittar |
| 9,080,097 B2 | 7/2015 | Gupta et al. |
| 9,128,203 B2 | 9/2015 | Al-Dossary et al. |
| 9,260,957 B2 | 2/2016 | Commarieu et al. |
| 9,274,249 B2 | 3/2016 | Thorne |
| 9,366,099 B2 | 6/2016 | Ly |
| 9,405,033 B2 | 8/2016 | Marsala et al. |
| 9,494,033 B2 | 11/2016 | Taherian et al. |
| 9,557,434 B2 | 1/2017 | Keller et al. |
| 9,611,736 B2 | 4/2017 | Marsala et al. |
| 9,644,472 B2 | 5/2017 | Fuhst et al. |
| 9,651,700 B2 | 5/2017 | Marsala et al. |
| 9,689,253 B2 | 6/2017 | Rivero |
| 9,696,450 B2 | 7/2017 | Marsala et al. |
| 9,733,191 B2 | 8/2017 | Bittar et al. |
| 9,863,244 B2 | 1/2018 | Donzier et al. |
| 9,952,192 B2 | 4/2018 | Donzier et al. |
| 9,983,328 B2 | 5/2018 | Marsala et al. |
| 10,030,486 B1 | 7/2018 | Keller |
| 10,095,983 B1 | 10/2018 | Venter et al. |
| 10,125,546 B2 | 11/2018 | Wu et al. |
| 10,125,586 B2 | 11/2018 | Balan et al. |
| 10,132,952 B2 | 11/2018 | Marsala et al. |
| 10,145,975 B2 | 12/2018 | Marsala et al. |
| 10,156,654 B2 | 12/2018 | Marsala et al. |
| 10,254,430 B2 | 4/2019 | Fang et al. |
| 10,267,943 B2 | 4/2019 | Marsala et al. |
| 10,288,755 B2 | 5/2019 | Cordery |
| 10,294,771 B2 | 5/2019 | Donzier et al. |
| 10,472,951 B2 | 11/2019 | Donzier et al. |
| 10,527,751 B2 | 1/2020 | Donzier et al. |
| 10,570,716 B2 | 2/2020 | Balan et al. |
| 10,612,360 B2 | 4/2020 | Al-Qasim et al. |
| 10,677,034 B2 | 6/2020 | Balan et al. |
| 10,677,035 B2 | 6/2020 | Balan et al. |
| 10,808,529 B2 | 10/2020 | Ow et al. |
| 10,968,737 B2 | 4/2021 | Marsala |
| 2001/0017163 A1 | 8/2001 | Penza |
| 2002/0029907 A1* | 3/2002 | Carriere ................. E21B 19/22 175/57 |
| 2004/0108110 A1 | 6/2004 | Zupanick et al. |
| 2004/0246141 A1 | 12/2004 | Tubel et al. |
| 2005/0034917 A1 | 2/2005 | Mathiszik et al. |
| 2005/0078555 A1 | 4/2005 | Tang et al. |
| 2005/0252286 A1 | 11/2005 | Ibrahim et al. |
| 2006/0044940 A1 | 3/2006 | Hall et al. |
| 2006/0104578 A1 | 5/2006 | Herbst |
| 2007/0246649 A1 | 10/2007 | Jacobi et al. |
| 2007/0256832 A1 | 11/2007 | Hagiwara et al. |
| 2008/0066960 A1 | 3/2008 | Mathiszik |
| 2008/0257546 A1 | 10/2008 | Cresswell et al. |
| 2008/0290874 A1 | 11/2008 | Seleznev et al. |
| 2009/0087911 A1 | 4/2009 | Rogerio |
| 2009/0164188 A1 | 6/2009 | Habashy |
| 2009/0288820 A1 | 11/2009 | Barron et al. |
| 2010/0025110 A1* | 2/2010 | John ....................... E21B 44/00 175/27 |
| 2010/0109672 A1 | 5/2010 | Rabinovich et al. |
| 2010/0132448 A1 | 6/2010 | Donadille et al. |
| 2010/0198519 A1 | 8/2010 | Wilt et al. |
| 2010/0200248 A1 | 8/2010 | Kriesels et al. |
| 2010/0296100 A1 | 11/2010 | Blacklaw |
| 2011/0042083 A1 | 2/2011 | Sierra et al. |
| 2011/0088895 A1 | 4/2011 | Pop et al. |
| 2011/0309835 A1 | 12/2011 | Barber et al. |
| 2012/0016649 A1 | 1/2012 | Thambynayagam et al. |
| 2012/0062886 A1 | 3/2012 | Piotti et al. |
| 2012/0111561 A1 | 5/2012 | Frey et al. |
| 2012/0178653 A1 | 7/2012 | McClung, III |
| 2012/0253680 A1 | 10/2012 | Thompson |
| 2012/0268135 A1 | 10/2012 | Marsala et al. |
| 2012/0325465 A1 | 12/2012 | Hammer et al. |
| 2013/0091941 A1 | 4/2013 | Huh |
| 2013/0284434 A1* | 10/2013 | Marvel ................... E21B 47/04 166/384 |
| 2014/0041862 A1 | 2/2014 | Ersoz |
| 2014/0180592 A1 | 6/2014 | Ravi |
| 2014/0180658 A1 | 6/2014 | Rossi |
| 2014/0203810 A1 | 7/2014 | Marsala et al. |
| 2014/0203811 A1 | 7/2014 | Marsala et al. |
| 2014/0208843 A1 | 7/2014 | Godfrey |
| 2014/0238670 A1 | 8/2014 | Pop et al. |
| 2014/0239957 A1 | 8/2014 | Zhang et al. |
| 2014/0361777 A1 | 12/2014 | Marsala et al. |
| 2015/0061683 A1 | 3/2015 | Marsala et al. |
| 2015/0061684 A1 | 3/2015 | Marsala et al. |
| 2015/0132543 A1 | 5/2015 | Nouzille et al. |
| 2015/0204993 A1 | 7/2015 | Leggett, III et al. |
| 2015/0232748 A1 | 8/2015 | Kanj et al. |
| 2015/0370934 A1 | 12/2015 | Pride et al. |
| 2016/0041296 A1 | 2/2016 | Ahmad et al. |
| 2016/0138390 A1 | 5/2016 | Arntsen |
| 2016/0259079 A1 | 9/2016 | Wilson |
| 2016/0282881 A1 | 9/2016 | Filippov |
| 2016/0291194 A1 | 10/2016 | Marsala et al. |
| 2017/0059668 A1 | 3/2017 | Chang et al. |
| 2017/0314385 A1 | 11/2017 | Hori et al. |
| 2017/0351000 A1 | 12/2017 | Marsala et al. |
| 2018/0066515 A1 | 3/2018 | Marsala et al. |
| 2018/0128937 A1 | 5/2018 | Donzier et al. |
| 2018/0275306 A1 | 9/2018 | Marsala et al. |

(56) References Cited

U.S. PATENT DOCUMENTS

| | | |
|---|---|---|
| 2018/0298752 A1 | 10/2018 | Balan et al. |
| 2018/0320514 A1 | 11/2018 | Felkl et al. |
| 2018/0347349 A1 | 12/2018 | Marsala |
| 2019/0003291 A1 | 1/2019 | Balan et al. |
| 2019/0003292 A1 | 1/2019 | Balan et al. |
| 2019/0003303 A1 | 1/2019 | Donzier et al. |
| 2019/0011593 A1 | 1/2019 | Marsala et al. |
| 2019/0107643 A1 | 4/2019 | Gabad et al. |
| 2019/0169975 A1 | 6/2019 | Al-Qasim et al. |
| 2019/0266501 A1 | 8/2019 | Tavares |
| 2019/0293814 A1 | 9/2019 | Horne |
| 2019/0339408 A1 | 11/2019 | Davies |
| 2019/0368336 A1 | 12/2019 | Hammond et al. |
| 2019/0376821 A1 | 12/2019 | Donzier et al. |
| 2019/0391034 A1 | 12/2019 | Al Jabri |
| 2020/0030777 A1 | 1/2020 | Al-Jabri et al. |
| 2020/0031738 A1 | 1/2020 | Al-Jabri et al. |
| 2020/0032148 A1 | 1/2020 | Al-Jabri et al. |
| 2020/0034711 A1 | 1/2020 | Misra et al. |
| 2020/0116019 A1 | 4/2020 | Ow et al. |
| 2020/0208513 A1 | 7/2020 | Al-Qasim et al. |
| 2020/0408089 A1 | 12/2020 | Ow et al. |
| 2022/0307337 A1 | 9/2022 | Marsala et al. |

FOREIGN PATENT DOCUMENTS

| | | |
|---|---|---|
| EP | 1803001 | 2/2012 |
| EP | 2966257 | 1/2016 |
| GB | 2489714 | 10/2012 |
| GB | 2563739 | 12/2018 |
| WO | WO 2005119303 | 12/2005 |
| WO | WO 2006059057 | 6/2006 |
| WO | WO 2010135584 | 11/2010 |
| WO | WO 2011129828 | 10/2011 |
| WO | WO 2012115717 | 8/2012 |
| WO | WO 2014051789 | 4/2014 |
| WO | WO 2014058425 | 4/2014 |
| WO | WO 2014060562 | 4/2014 |
| WO | WO 2014144917 | 9/2014 |
| WO | WO 2014207075 | 12/2014 |
| WO | WO 2015016932 | 2/2015 |
| WO | WO 2015027084 | 2/2015 |
| WO | WO 2015167935 | 11/2015 |
| WO | WO 2015187142 | 12/2015 |
| WO | WO 2015192226 | 12/2015 |
| WO | WO 2016200374 | 12/2016 |
| WO | WO 2018085504 | 5/2018 |
| WO | WO 2018234431 | 12/2018 |

OTHER PUBLICATIONS

Abbassi et al., "Efficiency Improvements in Production Profiling Using Ultracompact Flow Array Sensing Technology," Petrophysics, Aug. 2018, 59:4 (457-488), 32 pages.

aflglobal.com' [online], "MiniBend Fiber Optic Component for Downhole Double-Ended Systems and Optical Connectivity," available on or before Jun. 8, 2012, retrieved on Jun. 12, 2018, retrieved from URL: <https://www.aflglobal.com/productlist/Product-Lines/Fiber-Optic-Cable/MiniBend_for_Downhole_Double-Ended_Systems__Optic/doc/MiniBend.aspx>, 1 page.

Ali et al., "Constraining Interwell Water Flood Imaging with Geology and Petrophysics: An Example from the Middle East," Paper presented at the 2009 SPE Middle East Oil & Gas Show and Conference, Bahrain, Mar. 15-18, 2009, SPE 120558; 11 pages.

Alinejad and Rezaee, "Depositional Environment Interpretation of Lar Formation (Upper Jurassic) Based on Study of Clay Mineralogy and Microfacies in East Azarbaijan (North Western of Iran)," Asian Journal of Earth Sciences, 2014, 7(1): 17-26.

Alkhatib et al., "Robust Quantification of Uncertainty in Heterogeneity for Chemical EOR Processes: Applying the Multi-Level Monte Carlo Method," SPE-172635-MS, Society of Petroleum Engineers (SPE), presented at the SPE Middle East Oil & Gas Show and Conference, Bahrain, Mar. 8-11, 2015, 13 pages.

Allard et al., "Core-shell type dually fluorescent polymer nanoparticles for ratiometric pH-sensing," J. Polym. Sci., Part A: Polym. Chem., 2008, 46(18):6206-6213, 8 pages.

Alsaif et al., "Petrophysical Joint Inversion for Reservoir Saturation Mapping: A Case Study," SPE-188143-MS, Society of Petroleum Engineers (SPE), presented at the SPE Kingdom of Saudi Arabia Annual Technical Symposium and Exhibition held in Dammam, Saudi Arabia, Apr. 24-27, 2017, 7 pages.

Al-Shehri et al., "Illuminating the Reservoir: Magnetic NanoMappers," SPE 164461, Society of Petroleum Engineers (SPE), presented at the SPE Middle East Oil and Gas Show and Exhibition on Mar. 10-13, 2013, 10 pages.

Bakulin et al., "Smart DAS upholes for near surface model building and deep imaging with vertical arrays," International Conference on Engineering Geophysics, Oct. 2017, 5 pages.

Behnke et al., "Encapsulation of Hydrophobic Dyes in Polystyrene Micro- and Nanoparticles via Swelling Procedures," J. Fluoresc., 2011, 21(3):937-944, 8 pages.

Bennetzen et al., "Novel Applications of Nanoparticles for Future Enhanced Oil Recovery", IPTC-17857-MS, presented at the International Petroleum Technology Conference (IPTC), Dec. 10-12, 2014, 14 pages.

Brie et al., "Shear Sonic Interpretation in Gas-Bearing Sands," SPE 30595, Society of Petroleum Engineers (SPE), presented at the SPE Annual Technical Conference and Exhibition, Oct. 22-25, 1995, 10 pages.

Burtman et al, "Experimental Study of Induced Polarization Effect in Unconventional Reservoir Rocks," Geomaterials 04:04, Jan. 1, 2014, 13 pages.

Carey et al., "Analysis of water hammer signatures for fracture diagnostics," Presented at the SPE Annual Technical Conference and Exhibition, Society of Petroleum Engineers, Jan. 2015, 26 pages.

Chaki et al., "Well Tops Guided Prediction of Reservoir Properties using Modular Neural Network Concept: A Case Study from Western Onshore, India," Indian Institute of Technology, 24 pages.

Cheng et al., "Comparison of Q-estimation methods: an update," Q-estimation, Crewes Research Report, vol. 25, 2013, 38 pages.

Cheng et al., "Estimation of Q: a comparison of different computational methods," Integration geoConvention 2013, Geoscience Engineering Partnership, 4 pages.

Danuor et al., "Determination of the Source and Depositional Environment of Sediments of Lake Bosumtwi using X-Ray Diffraction (XRD) Techniques," International Research Journal of Geology and Mining (IRJGM), Sep. 2012, 2(7): 186-198.

Davydycheva et al, "Electrical-Prospecting Method for Hydrocarbon Search Using the Induced-Polarization Effect," Geophysics, Society of Exploration Geophysicists, 71:4, Jul. 1, 2006, 11 pages.

Deschamps et al., "Drilling to the Extreme: the Micro-Coring Bit Concept," IADC/SPE 115187, International Association of Drilling Contractors (IADC), Society of Petroleum Engineers (SPE), presented at the IADC/SPE Asia Pacific Drilling Technology Conference and Exhibition, Aug. 25-27, 2008, 12 pages.

Desmette et al., "Drilling Hard and Abrasive Rock Efficiently, or Generating Quality Cuttings? You No Longer Have to Choose . . . ," SPE 116554, Society of Petroleum Engineers (SPE), 2008 SPE Annual Technical Conference and Exhibition, Sep. 21-24, 2008, 19 pages.

Dunham et al., "Hydraulic fracture conductivity inferred from tube wave reflections," In SEG Technical Program Expanded Abstracts 2017 (pp. 947-952). Society of Exploration Geophysicists, 6 pages.

Georgi, et al., "Advances in Cuttings Collection and Analysis," SPWLA 34th Annual Logging Symposium, Jun. 13-16, 1993, 20 pages.

Giles, "Multilevel Monte Carlo path simulation," Operations Research, 56:3 (607-617), May-Jun. 2008.

gpxsurveys.com.au' [online], "Ground Geophysics Induced Polarisation", available on or before Mar. 10, 2015, [retrieved Mar. 10, 2015], retrieved from URL: <http://www.gpxsurveys.com.au/Ground-Geophysics/Induced-Polarisation>, 2 pages.

(56) References Cited

OTHER PUBLICATIONS

Hillier, "Accurate quantitative analysis of clay and other minerals in sandstones by XRD: comparison of a Rietveld and a reference intensity ratio (RIR) method and the importance of sample preparation," Clay Minerals, 2000, 35: 291-302, 12 pages.

Kumar et al., "Petrophysical evaluation of well log data and rock physics modeling for characterization of Eocene reservoir in Chandmari oil field of Assam-Arakan basin, India," J Petrol Explor Prod Technol, 2018, 8: 323-340.

Li et al., "A Comparative Study of the Probabilistic-Collocation and Experimental-Design Methods for Petroleum-Reservoir Uncertainty Quantification," SPE Journal, 16:2 (429-439), Jun. 2011.

Liang et al., "Crosswell Electromagnetic Inversion Constrained by the Fluid-Flow Simulator," Paper presented at the SPE Annual Technical Conference and Exhibition, Florence, Italy, Sep. 19-22, 2010; 11 pages.

Liang et al., "Hydraulic fracture diagnostics from Krauklis-wave resonance and tube-wave reflections," Geophysics, 82(3): D171-D186, May-Jun. 2017, 16 pages.

Marsala et al., "3D inversion practice for crosswell electromagnetic surveys in horizontal wells in Saudi Arabia," 85th Annual International Meeting, SEG, 2015; 4 pages.

Marsala et al., "Crosswell electromagnetic induction between two widely spaced horizontal wells: Coiled-tubing conveyed data collection and 3D inversion from a carbonate reservoir in Saudi Arabia," 85th Annual International Meeting, SEG, 2015; 4 pages.

Marsala et al., "Crosswell Electromagnetic Tomography: from Resistivity Mapping to Interwall Fluid Distribution", IPTC 12229-PP, presented at the International Petroleum Technology Conference (IPTC) on Dec. 3-5, 2008, 6 pages.

Marsala et al., "First Borehole to Surface Electromagnetic Survey in KSA: reservoir mapping & monitoring at a new scale", Spe 146348-PP, Society of Petroleum Engineers (SPE), presented at the SPE Annual Technical Conference and Exhibition, Oct. 30-Nov. 2, 2011, 10 pages.

Marsala et al., "Fluid Distribution Inter-Well Mapping in Multiple Reservoirs by Innovative Borehole to Surface Electromagnetic: Survey Design and Field Acquisition," IPTC-17045, presented at the International Petroleum Technology Conference (IPTC), Beijing, China, Mar. 26-28, 2013; 4 pages.

Mohaghegh et al., "A Methodological Approach for Reservoir Heterogeneity Characterization Using Artificial Neural Networks," SPE 28394, Society of Petroleum Engineers (SPE), presented at the SPE Annual Technical Conference & Exhibition held in New Orleans, LA, U.S.A., Sep. 25-28, 1994; Society of Petroleum Engineers, 1994, 5 pages.

Munn et al., "Novel cable coupling technique for improved shallow distributed acoustic sensor VSPs," Journal of Applied Geophysics 138, Mar. 2017, 8 pages.

Musyanovych et al., "Preparation of Biodegradable Polymer Nanoparticles by Miniemulsion Technique and Their Cell Interactions," Macromolecular Bioscience, Feb. 2008, 8(2):127-139, 13 pages.

openfield-technology.com [online] "Micro instruments for harsh environments" OpenField Technologies of Paris, France, available on or before Apr. 17, 2020, retrieved from <https://www.openfield-technology.com/>.

Poitzsch et al., "Nanoparticle Tags for Improved Depth Correlation," IPTC-19785, International Petroleum Technology Conference (IPTC), IPTC Conference 2020, 2 pages (abstract only).

Rafik et al., "Prediction of permeability and porosity from well log data using the nonparametric regression with multivariate analysis and neural network, Hassi R'Mel Field, Algeria," Egyptian Journal of Petroleum, 2017, 26: 763-778, 16 pages.

Rahmani et al., "Characterizing Reservoir Heterogeneities Using Magnetic Nanoparticles", SPE-173195-MS, Society of Petroleum Engineers (SPE), presented at the SPE Reservoir Simulation Symposium on Feb. 23-26, 2015, 29 pages.

Reisch et al., "Fluorescent Polymer Nanoparticles Based on Dyes: Seeking Brighter Tools for Bioimaging," Small, Apr. 2016, 12(15): 1968-1992, 48 pages.

Rovetta et al., "Petrophysical Inversion of Resistivity Logging Data," SPE-184030-MS, Society of Petroleum Engineers (SPE), presented at the SPE Middle East Oil and Gas Show and Conference, Manama, Bahrain, Mar. 6-9, 2017, 13 pages.

Salehi et al., "Estimation of the non-records logs from existing logs using artificial neural networks," Egyptian Journal of Petroleum, 2017, 26: 957-968, 12 pages.

Santarelli et al., "Formation Evaluation From Logging on Cuttings," SPE Reservoir Evaluation and Engineering, presented at the 1996 SPE Permian Basin Oil and Gas Recovery Conference, Mar. 27-29, 1996, 7 pages.

Tang and Cheng, "A dynamic model for fluid flow in open borehole fractures," Journal of Geophysical Research: Solid Earth, 94, 7567-7576, Jun. 10, 1989, 10 pages.

Tatang et al., "An efficient method for parametric uncertainty analysis of numerical geophysical models," Journal of Geophysical Research, 102:D18 (925-21, 932), Sep. 27, 1997; pp. 21.

Till and Spears, "The determination of quartz in sedimentary rocks using an x-ray diffraction method," Clays and Clay Minerals, 1969, 17: 323-327.

Tonn, "The determination of the seismic quality factor Q from VSP data: a comparison of different computational methods," Geophysical Prospecting, 39, 1991, 27 pages.

U.S. Appl. No. 62/513,822, Bakulin et al., Detecting Sub-Terranean Structures, filed Jun. 1, 2017, 34 pages.

Vandamme et al., "How the Invasion Zone Can Contribute to the Estimation of Petrophysical Properties from Log Inversion at Well Scale?" SPWLA 58th Annual Logging Symposium, SPWLA-2017-JJJ, Jun. 17-21, 2017, 16 pages.

Verma et al., "Porosity and Permeability Estimation using Neural Network Approach from Well Log Data," GeoConvention 2012: Vision, 2012, 6 pages.

Vollrath et al., "Fluorescence imaging of cancer tissue based on metal-free polymeric nanoparticles—a review," J. Mater. Chem. B, Mar. 2013, 1(15):1994-2007, 15 pages.

Wilt et al., "Monitoring a Water Flood of Moderate Saturation Changes with Crosswell Electromagnetics (EM): A Case Study from Dom Joao Brazil," Paper presented at the SEG Las Vegas 2012 Annual Meeting, 2012; 4 pages.

Zhang et al., "Petrophysical Inversion of Resistivity Logging Data," SPE-63285-MS, Society of Petroleum Engineers (SPE), presented at the 2000 SPE Annual Technical Conference and Exhibition, Dallas, Texas, Oct. 1-4, 2000, 8 pages.

Zhdanov et al., "Carbonate Reservoir Rocks Show Induced Polarization Effects, Based on Generalized Effective Medium Theory", 75th EAGE Conference & Exhibition, Jun. 2013, 5 pages.

\* cited by examiner

WATER DETECTION FOR GEOSTEERING IN DIRECTIONAL DRILLING

CROSS-REFERENCE TO RELATED APPLICATION(S)

This application is a U.S. National Phase Application under 35 U.S.C. § 371 and claims the benefit of priority to International Application Serial No. PCT/IB2020/000529, filed May 26, 2020, the contents of which are hereby incorporated by reference.

BACKGROUND

The production of crude oil and other hydrocarbons starts with the drilling of a wellbore into a hydrocarbon reservoir. In many cases, the hydrocarbon reservoir is a narrow layer of material in the subterranean environment, making efficient targeting of the wellbore important for productivity. Accordingly, directional drilling is often used to direct a drill bit to form a wellbore in the reservoir layer.

Drilling may be performed by a rotating drill string, which uses the rotation of the drill string to power a bit to cut through subterranean layers. Changing the orientation of the bit for directional drilling may be performed using a mud motor, for example, by stopping the rotation of the drill string and activating the mud motor to power the drill bit while the drill string is slid forward down the well, while a bent section of the bottom hole assembly orients the drill string in a new direction. Any number of other techniques have been developed to perform directional drilling.

More recent developments have been in the use of coiled tubing drilling for directional drilling. Directional drilling using coiled tubing may be performed by a mud motor used with hydraulic actuators to change the direction of the bit.

Controlling the direction of the drill string in directional drilling, termed geosteering herein, may be done using any number of techniques. In early techniques, drilling was halted and downhole instrumentation, coupled to the surface by a wireline, was lowered into the wellbore. The wireline instrumentation was used to collect information on the inclination of the end of the wellbore and a magnetic azimuth of the end of the wellbore. This information was used in concert with the depth of the end of the wellbore, for example, measured by the length of the wireline or drill string, to determine the location of the end of the wellbore at a point in time, termed a survey. Collection of a number of surveys was needed to determine the changes needed in drilling operations for geosteering a wellbore to a reservoir layer.

SUMMARY

An embodiment described herein provides a method for geosteering in directional drilling. The method includes determining a signal-to-noise ratio (SNR) for an electromagnetic communication between devices on a bottom hole assembly, and determining a distance to water based, at least in part, on the SNR. Adjustments to geosteering vectors for the bottom hole assembly are determined based, at least in part, on the distance to water.

Another embodiment described herein provides a system for geosteering in directional drilling, comprising a bottom hole assembly. The bottom hole assembly includes a coiled tubing drilling apparatus and at least two mandrels mounted on the coiled tubing drilling apparatus, wherein each mandrel comprises an electromagnetic communication device. A controller is included to determine a distance to a water layer based, at least in part, on electromagnetic communications between the at least two mandrels. The system includes a drill bit.

DETAILED DESCRIPTION

Figure 1:
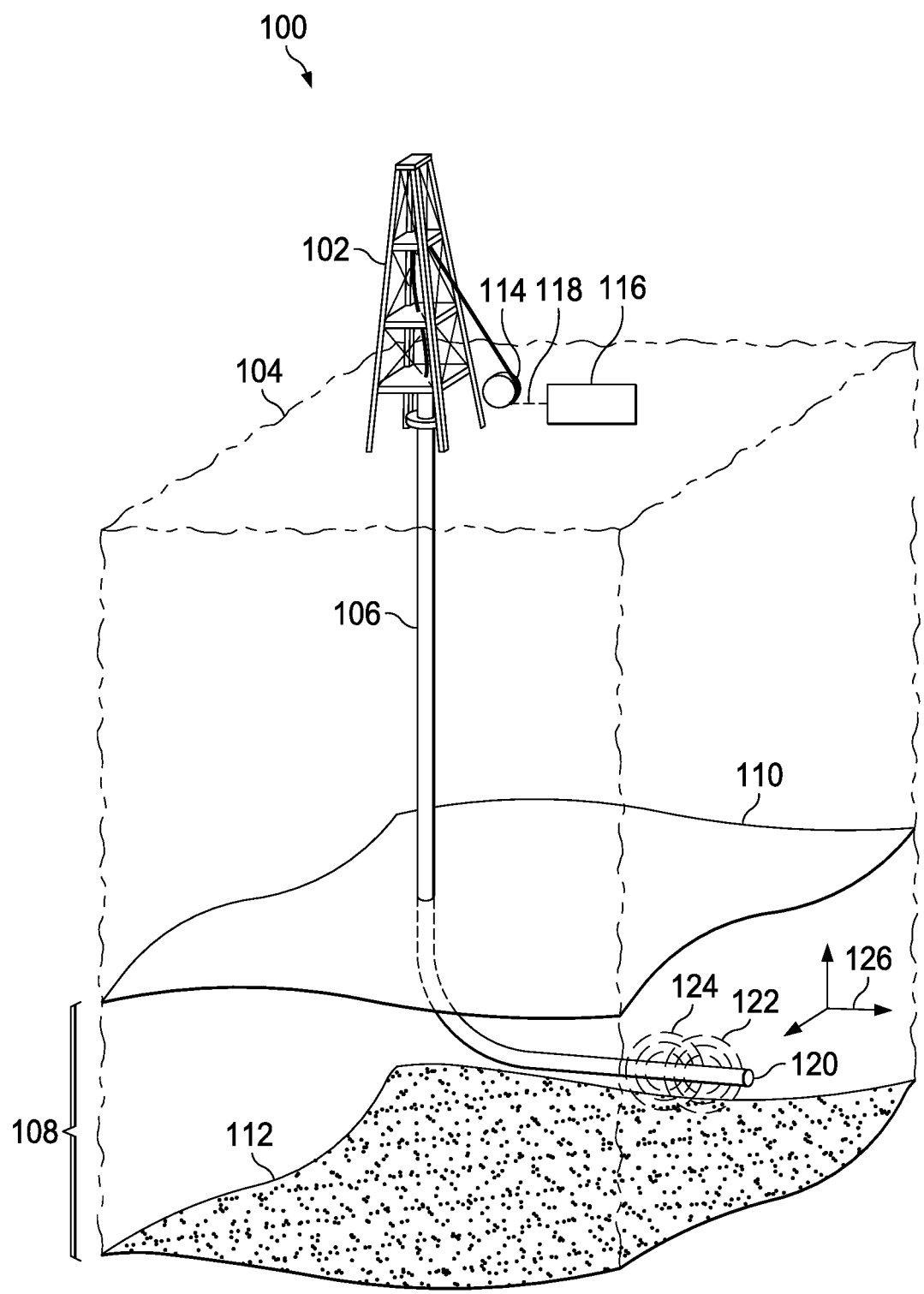
FIG. 1 is a schematic drawing of a method for geosteering a well during directional drilling using electromagnetic (EM) communication to determine proximity to a water layer.

Production Logging (PLT) is one of the key technologies to measure fluid properties in the oil industry. If this is done while drilling, termed logging while drilling (LWD) herein, the measured data can be used in to support drilling operations. The data collected in the LWD may be retrieved from the well by pulling the coiled tubing from the well and removing memory chips that have stored the data. In other examples the data may be sent to the surface through but pulse telemetry, wireline connections, or other techniques. This is termed measurement while drilling (MWD) herein. Generally, LWD is used to describe both concepts herein.

The data may be used to geosteer the wells, e.g., direct the drilling trajectory using hydrocarbon production information. This may allow the well to be targeted inside the most prolific reservoir layers. In some applications, the log data from the LWD may be used to change the trajectory of the wells once it is analyzed. In other applications, the data collected in real time from the MWD may be used to either automate the trajectory control, or to provide information to an operator to change the trajectory if needed.

Coiled tubing may be used to drill wellbores in an underbalanced condition, in which the pressure in the formation is lower than the pressure in the wellbore. This may be performed by using a sealed surface system that allows the coiled tubing to pass through while sealing around it and diverting fluids flowing into the wellbore. Drilling in an underbalanced condition protects the reservoir from damage due to drilling fluids, leak off, and other conditions, as fluids, including gas are flowing into the wellbore during the drilling process. In drilling of gas wells in underbalanced conditions, gas from the formation is flowing in the annulus, i.e., the region in the wellbore between the coiled tubing and the rock formation. This allows the use of the LWD/MWD techniques described herein.

Provided herein are LWD/MWD techniques that allow the measurement and evaluation of the proximity of a bottom hole assembly to water, such as in a water layer below a reservoir. This is preformed using a tool that includes at least two mandrels that are in radio communication with each other. The presence of water may be detected by the determination of the effects of the water on the communication between the two mandrels. In an embodiment, one mandrel is operated as a RF EM emitter while the second mandrel is operated as a receiver. The RF EM wave is reflected at layer boundaries where conductivity and dielectric properties vary. For example, a water table plane is a strong reflector for the RF EM wave which is detected by the receiver antenna.

The detection may be either in the time domain, similar to a pulse echo or continuous wave radar principle, or in the amplitude domain, wherein the conductive plane attenuates the EM energy transfer between spaced mandrels. The straight line distance to the water table from the well bore is derived from acquired signals and known distance between mandrels.

As an example of an amplitude domain determination, as a mandrel moves closer to a water layer, the signal-to-noise ratio of the radio communication from that mandrel will decrease. The changes in the signal to noise ratio may be used to determine the proximity to the water layer. Other communication techniques may be used for directionality, such as multiple antennae placed around the mandrel, wherein the antennae are communicating at different frequencies. The different frequencies may change the susceptibility to water interference, allowing a determination of distance to the water layer.

The mandrels may also include other sensors for determining location by seismic and sound sensing, determining gas parameters, and determining hydrocarbon composition, among others. The data collected supports geosteering in more productive gas or oil layers of a reservoir. The techniques also relate to measurements of multiphasic flows in oil and gas wells at downhole conditions. Production Logging (PL), including LWD and MWD of oil and gas wells has numerous challenges related to the complexity of multiphasic flow conditions and severity of downhole environment.

In particular, gas, oil, water, mixtures flowing in wells, will present bubbles, droplets, mist, segregated wavy, slugs, and other structures depending on relative proportions of phases, their velocities, densities, viscosities, as well as pipe dimensions and well deviations. Accordingly, in order to achieve good understanding of individual phases a number of gas parameters must be measured, including, for example, flowrates, bubble contents, water content, and the like. Further, detection of the proximity to water, such as in a water layer below the reservoir, and a determination of the distance to the water layer is useful for understanding the well environment and adjusting the trajectory of the wellbore.

The wellbores provide an aggressive environment that may include high pressures, for example, up to 2000 bars, high temperature, for example, up to 200° C., corrosivity from $H_2S$ and $CO_2$, and high impacts. These environmental conditions place constraints on sensors and tool mechanics. Further, solids present in flowing streams, such as cuttings and produced sand, can damage equipment. In particular, sand entrained from reservoir rocks will erode parts facing flow. Solids precipitated from produced fluids due to pressure and temperature changes, such as asphalthenes, paraffins or scales, create deposits that can contaminate sensors or blocking moving parts, such as spinners. Cost is also an important parameter in order to provide an economically viable solution to well construction optimization.

FIG. 1 is a schematic drawing of a method 100 for geosteering a well during directional drilling using electromagnetic (EM) communication to determine proximity to a water layer. In the method 100, a drilling rig 102 at the surface 104 is used to drill a wellbore 106 to a reservoir layer 108. In this illustration, the reservoir layer 108 is bounded by an upper layer 110, such as a layer of cap rock, and a lower layer 112, such as a layer containing water.

The drilling rig 102 is coupled to a roll of coiled tubing 114, which is used for the drilling. A control shack 116 may be coupled to the roll of coiled tubing 114 by a cable 118 that includes transducer power lines and other control lines. The cable 118 may pass through the coiled tubing 114, or alongside the coiled tubing 114, to the end 120 of the wellbore 106, where it couples to the BHA used for drilling the wellbore 106. In some embodiments described herein, a cable is not used as the sensor packages and controllers are powered by batteries and communicate with the surface through other techniques, such as mud pulse telemetry (MPT), through drilling mud or other incompressible fluids flowing through the wellbore.

In embodiments described herein, EM communicators on the mandrels allow communication of data from a first mandrel, closer to the drillbit at the end 120 of the wellbore, to pass data to a second mandrel farther from the drillbit. For example, the first mandrel emits EM signals 122 that may be received by the second mandrel. During communication, the second mandrel emits EM signals 124 that may be received by the first mandrel. The second mandrel may record the measurements in a local data store, relay the measurements to the surface, or both.

Further, a local controller, for example, located in the second mandrel, may calculate adjustments to the trajectory of the wellbore, and make the trajectory adjustments locally. Additional sensors may be used to measure the components and velocity of materials passing through the outer annulus of the wellbore 106, for example, measuring velocity, phases, and the like. The trend of these measurements may be used to determine whether the BHA is within a producing zone of the reservoir layer 108, has left the producing zone, or is approaching the lower layer 112. This information, along with the information on the structure of the layers 110 and 112, is used to adjust the vectors 126 to steer the wellbore 106 in the reservoir layer 108 back towards a product zone. For example, if the material flowing into the wellbore in the unbalanced wellbore is increasing in water or fluids, the BHA may be approaching the lower layer 112. Other sensors, such as EM sensors, may be used to confirm that. Accordingly, the vectors 126 may be adjusted to direct the BHA back towards a gas zone in the reservoir layer 108.

Figure 2:
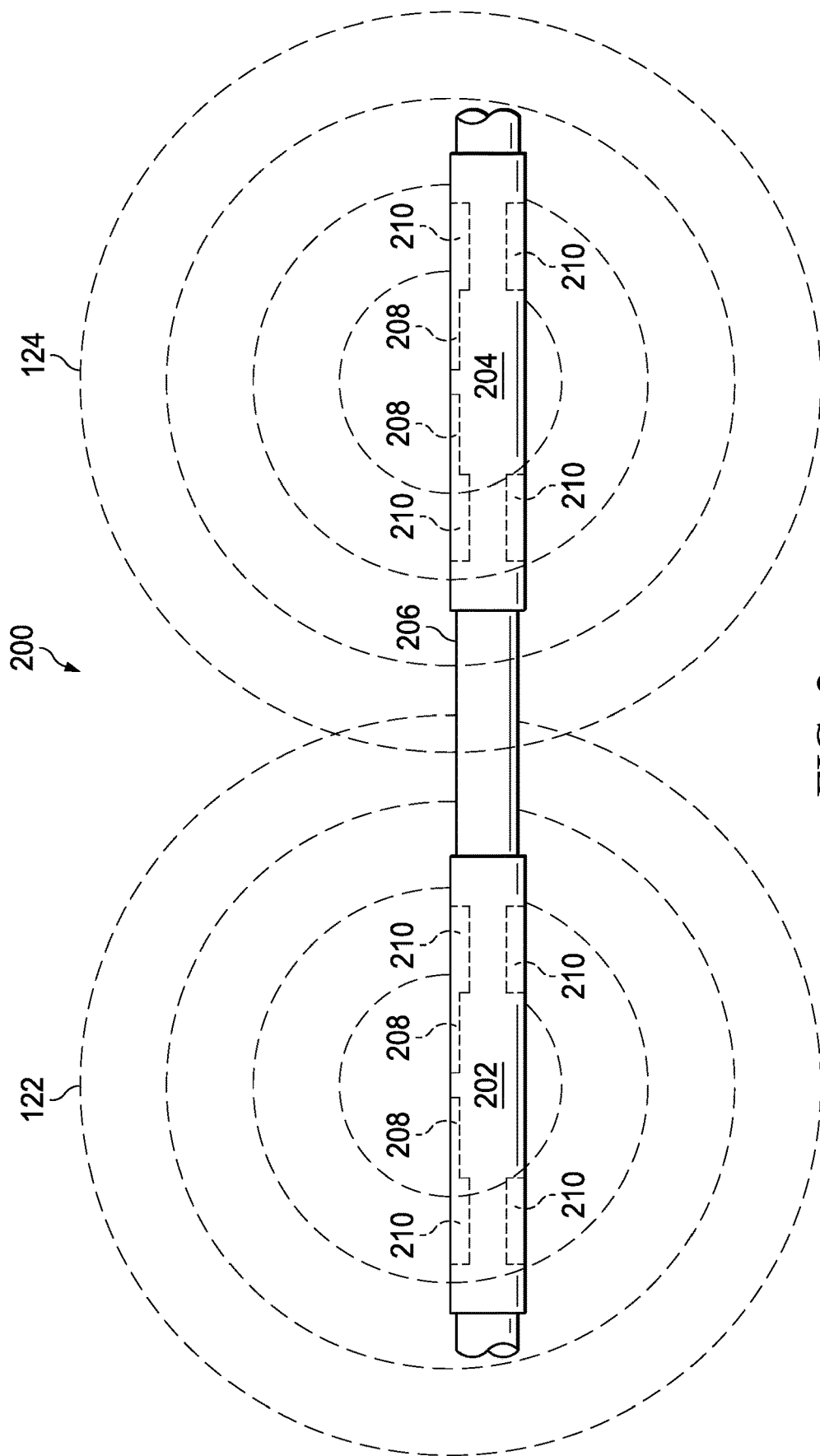
FIG. 2 is a drawing of an instrumented bottom hole assembly (BHA) that may be used for geo-steering in directional drilling in coiled tubing drilling (CTD) using gas parameter measurements.

FIG. 2 is a drawing of an instrumented bottom hole assembly (BHA) 200 that may be used for geo-steering in directional drilling in coiled tubing drilling (CTD) using gas parameter measurements. Like numbered items are as described with respect to FIG. 1. In this embodiment, the BHA 200 has two instrumented mandrels. A first mandrel 202 is located near a drillbit (not shown), and a second mandrel 204 is located further away from the drillbit, separated from the first mandrel 202 by a spacer pipe 206. Although two instrumented mandrels are shown in FIG. 2, more instrumented mandrel may be used.

The two mandrels 202 and 204 may communicate with each other, for example, through EM signals 122 and 124 linking EM antennae 208 on each of the mandrels 202 and 204. This enables the communication system with the surface to be installed in only one of the mandrels. For example, the second mandrel 204 may be located farther from the drillbit, and may handle communication with the surface, using a mud pulse telemetry system. The first mandrel 202 may be located closer to the drill bit, and send data to the second mandrel 204 to be sent to the surface. Thus, in addition to measurement trends, e.g., in time, the use of two mandrels allows determination of differences in location as the wellbore is being drilled.

Sensor packages 210 are mounted along each of the mandrels 202 and 204, for example, in embedded slots formed in the outer surface of the mandrels 202 and 204. The sensor packages 210 may include multiple sensors assembled into a strings, or packets, of sensors, which are mounted in recesses along the mandrels. The sensors may include micro electro mechanical systems (MEMS) pressure sensors, temperature sensors, optical sensors, ultrasonic sensors, conductivity sensors, and the like. The sensors are available from OpenField Technologies of Paris, France (https://www.openfield-technology.com/).

Figure 3:
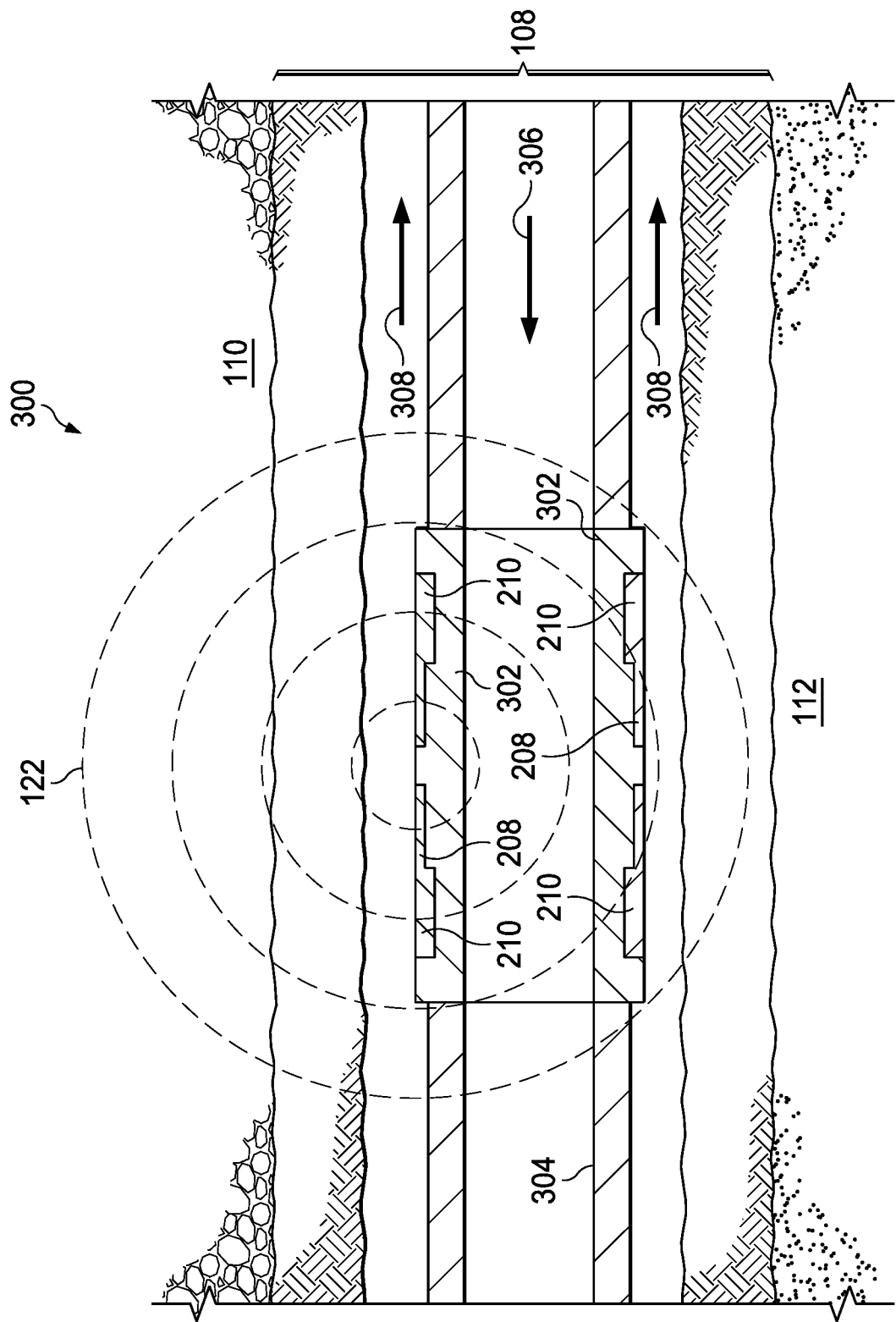
FIG. 3 is a schematic drawing of fluid flow through a sensor equipped mandrel.

FIG. 3 is a schematic drawing 300 of fluid flow through a sensor equipped mandrel 302. Like numbered items are as described with respect to FIG. 2. In a schematic drawing 300, drilling fluid 306 from the surface flows through the coil tubing line 304 in the direction of the drill bit. A mixture 308 of drilling fluid 306 and produced fluids is returned to the surface through the annulus. The produced fluids may include gas, oil, and reservoir water.

The EM antennae 208 allow for communication with other mandrels, but also provide a detection system for determining the proximity of the mandrel 302 to a lower layer 112 containing water. The EM signals 122 are blocked from entering the conductive water of the lower layer 112, decreasing the signal to noise ratio of the communication. Locating multiple EM antennae 208 around the mandrel 302 may provide information on the distance to the water layer, as the antenna located on an opposite surface of the mandrel 302 from the lower layer 112 may not experience as large a decrease in signal to noise ratio.

Sensor packages 210 along the mandrel 302 may include an ultrasonic Doppler system to measure the velocity of fluid flow. For example, an ultrasonic transducer is oriented to emit an ultrasonic wave into the fluid flow, which is reflected off bubbles or particles in the fluid flow. An ultrasonic detector picks up the reflected sound, and can be used to calculate the velocity from the frequency shift as particles or bubbles approach the detector. The ultrasonic Doppler system can also provide the information to determine the gas content of the two-phase stream in the annulus of the wellbore, for example, by quantitating the bubbles of an internal phase, and determining their size. In some embodiments, a micro spinner is included to measure the flow velocity instead of, or in addition to, the Doppler measurement. The micro spinner may use an electrical coil or a magnet to detect spinning rate, which is proportional to the flow rate.

The sensor packages 210 may include a MEMS pressure transducer to measure pressure outside of the mandrel 202 or 204. A conductivity probe may be included to measure fluid conductivity at a high frequency, allowing a determination of hydrocarbon to water phase in a two-phase stream.

The information from the sensor packages 210 is combined with information from other geophysical measurements to assist in geosteering. For example, seismic measurements may be used to determine probable locations of boundary layers 110 and 112. As described herein, geophysical models may be generated and used with the data from the gas sensors.

Figure 4:
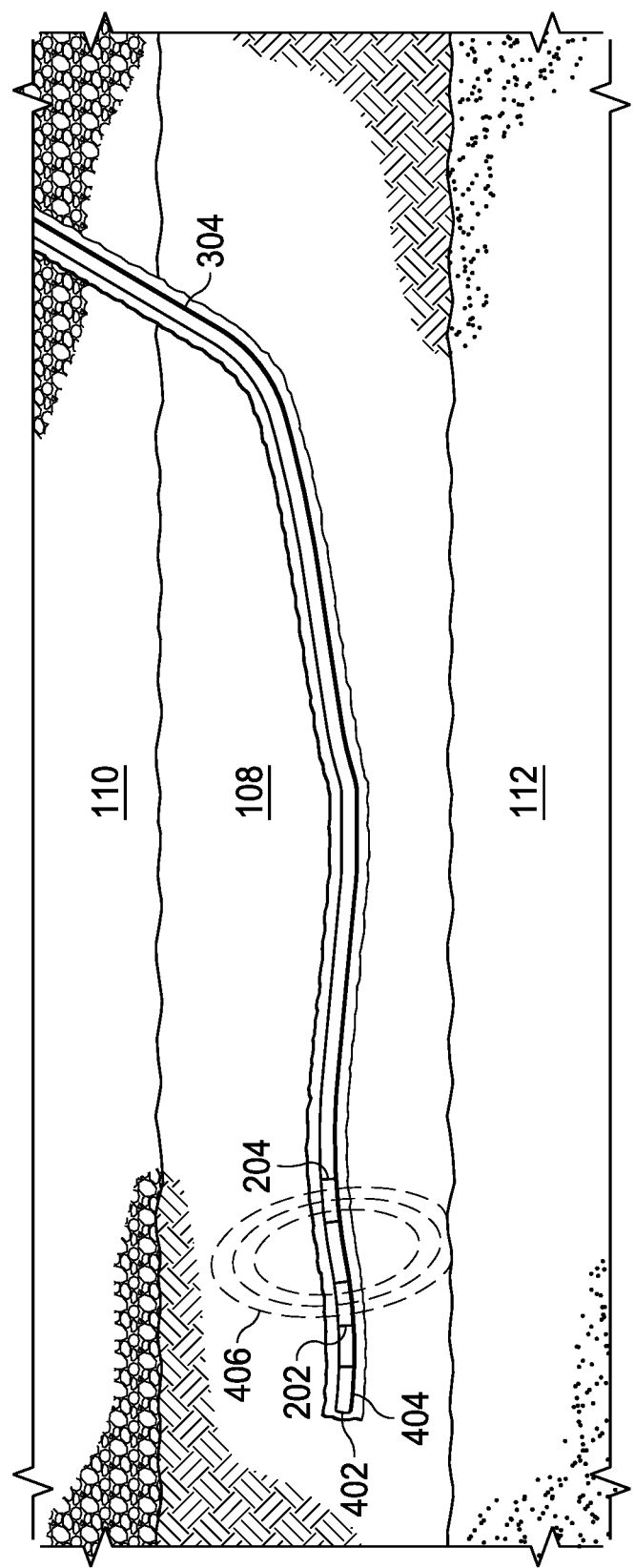
FIG. 4 is a schematic drawing of geosteering in a well.

FIG. 4 is a schematic drawing of geosteering in a well. Like numbered items are as described with respect to FIGS. 1-3. The separations of the sensors in the sensor packages 210 between the first mandrel 202 and the second mandrel 204 provide a separation of measurements in space, allowing targeting to be performed based on the differences in the measurements between the mandrels 202 and 204. For example, if the water measured in the mixture 308 at the first mandrel 202, closer to the drillbit 402, are higher than the water measured at the second mandrel 204, it may indicate that the drillbit 402 is leaving the reservoir layer 108. Accordingly, the trajectory of the well may be adjusted to bring the drillbit 402 back into the productive zone.

As described herein, the EM signals 406 that allow communication between the first mandrel 202 and the second mandrel 204 are used for the determination of proximity to water layers. As shown in FIG. 4, the EM signals 406 are blocked by the water in the lower layer 112. The determination of the proximity of the mandrels 202 and 204 to the lower layer 112 may be used as a sensor reading for geosteering the trajectory of the wellbore, as described herein. For example, if a mandrel 202 is determined to be too close to a water layer, the drillbit 402 may be steered away from the water layer.

Trends over time of sensor readings at the mandrels 202 and 204 may also be used for geosteering. For example, if the water measured at the first mandrel 202 increases, this may indicate that the drillbit 402 is nearing lower layer and the leaving the reservoir layer 108.

A telemetry package 404 may also be located directly behind the drillbit 402 to provide further information about the location of the drillbit 402. This may include seismic detectors and transducers that can locate the drillbit 402 in three-dimensional space. The telemetry data may be transferred back to the surface directly from the telemetry package 404, through mud pulse telemetry, fiber optical cables, or through other communications techniques. In one embodiment, the telemetry package 404 may communicate with the second mandrel 204 through electromagnetic waves and the second mandrel 204 may communicate the telemetry data to the surface, for example through mud pulse telemetry.

Figure 5:
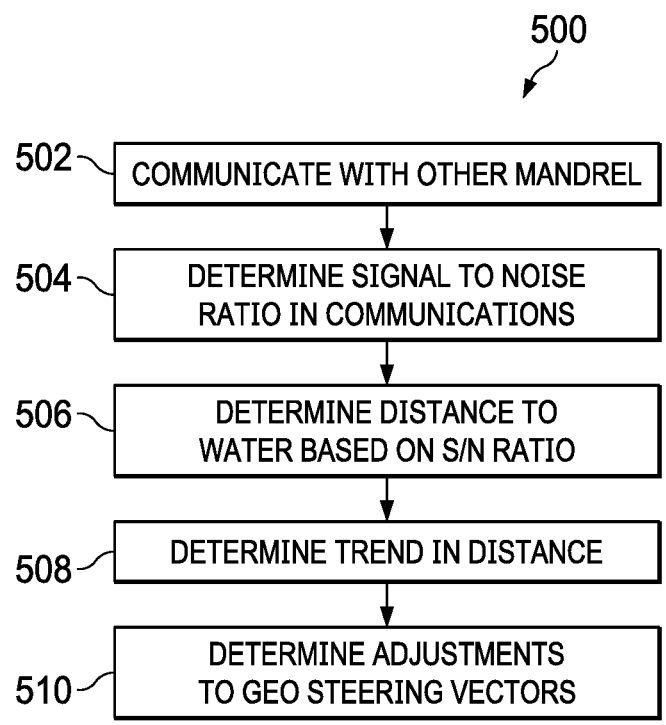
FIG. 5 is a process flow diagram of a method for using EM communication between mandrels for geosteering in coiled tubing drilling.

FIG. 5 is a process flow diagram of a method 500 for using EM communication between mandrels for geosteering in coiled tubing drilling. The method begins at block 502, with communication with another mandrel. As described herein, the communication may include the transfer of data relating to measurements of pressure, temperature, flow velocity, the amount of gas in the liquid fraction of the produced fluids, and the presence of conductive fluids, among others. The data may be transferred to a single mandrel for storage or to be transferred to the surface.

At block 504, the signal-to-noise ratio in the EM signals are determined. At block 506, the change in the signal-to-noise ratio is used to determine a distance to a water layer. In some embodiments, the distance to the water table is calculated by sending a signal from a first antenna, for example, on a first mandrel, and detecting reflections at a second antenna, for example, at a second mandrel. The reflections may allow the determination of the distance to a water layer.

At block 508, the trend in the signal-to-noise is determined. As the measurements of signal-to-noise are quantitative, the analysis of the data during the trajectory of the drilling of the wellbore provides the information that can be used to determine if the wellbore is being drilled in the targeted structural layer of the reservoir or is approaching a water layer.

In some embodiments, the signal-to-noise measurements and the trends in the signal-to-noise measurements are integrated with other measurements from sensors mounted along the mandrels and a priori information of the area, including, for example, geological structural models and dynamic models of the area. Other measurements that may be used along with the signal-to-noise measurements include acoustic measurements, measurements from cuttings, or flow measurements at the surface, to assess if the wellbore is still being drilled into an economically productive reservoir layer.

At block 510, adjustments to geosteering vectors are determined. The information obtained from the combination of the signal-to-noise measurements, and the parameters measured by other sensors, along with trends and modeling parameters, may be used to determine adjustments to the geosteering vectors. For example, the information may indicate that the wellbore needs to be steered to the right, left, up, or down. In coiled tubing drilling, a mud motor can be used to change the direction of the drillbit, thus changing the trajectory of the wellbore. The determination of the direction to steer the drillbit is based on the tool measurements and the knowledge of the geological setting. For example, if the signal-to-noise measurements of the EM communication indicate the presence of water around the tool, this indicates that the BHA is proximate to the lower layer 112, or water aquifer, and that steering the drillbit upward away from the water will increase the percentage of the hydrocarbon produced.

In some examples, the information may indicate that the wellbore has left the productive zone. In some embodiments, the coiled tubing is removed to allow a completely different direction to be drilled. In other embodiments, leaving the productive zone indicates that the drilling is completed and further well completion activities may be performed to begin production, such as fracturing the rock around the well environment, installing casing, cementing the casing in place, perforating the casing, or positioning of production tubing in the wellbore, and the like, depending on the application and well environment.

Figure 6:
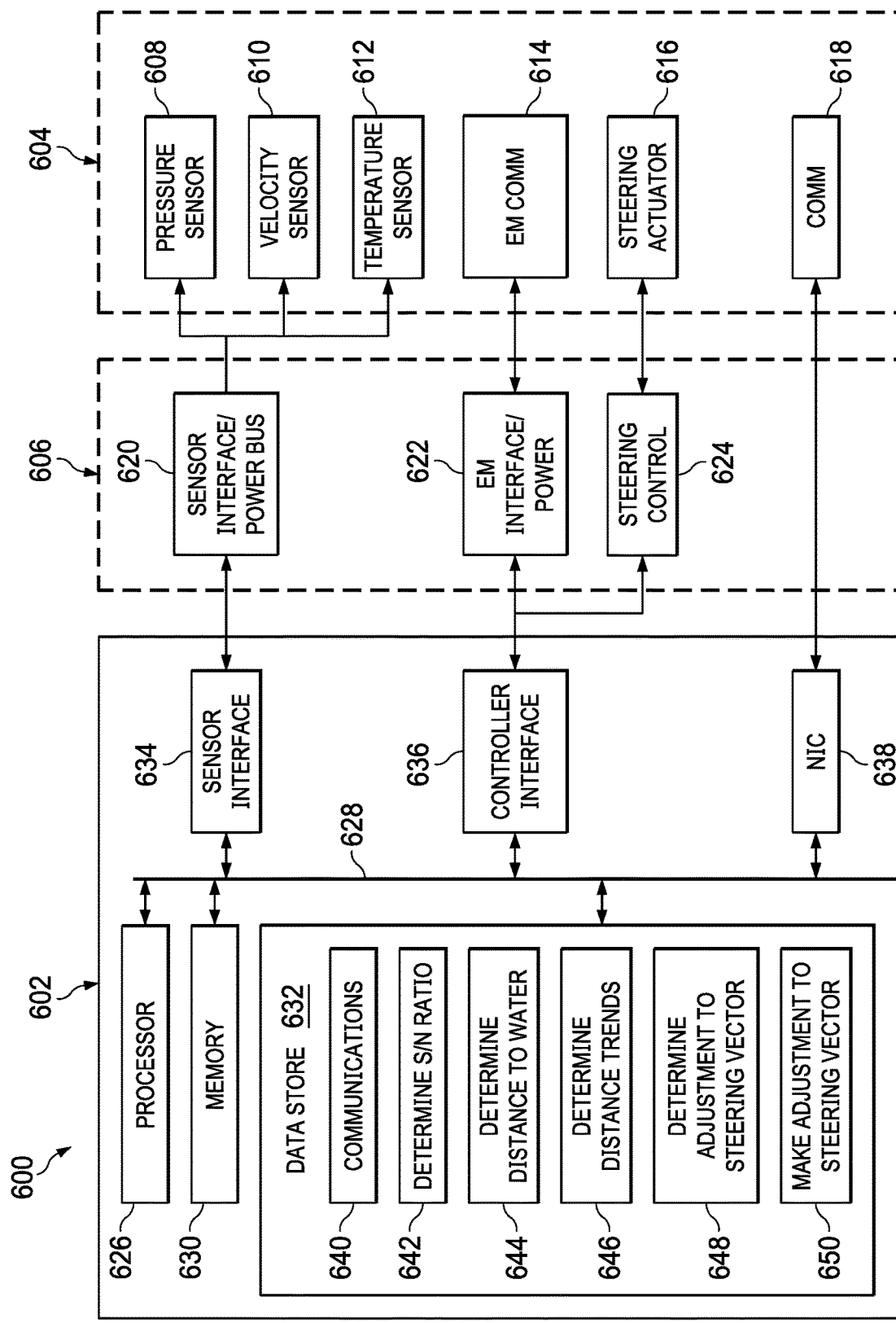
FIG. 6 is a block diagram of a system that may be used for geosteering the BHA based, at least in part, on data from gas parameters measured by sensors deployed on the BHA.

FIG. 6 is a block diagram of a system 600 that may be used for geosteering the BHA based, at least in part, on data from EM communication devices and sensors deployed on the BHA. The system 600 includes a controller 602 and BHA sensors/actuators 604 that are coupled to the controller 602 through a number of sensor interfaces 606. In the embodiment shown in FIG. 6, the BHA sensors/actuators 604 include a pressure sensor 608, a velocity sensor 610, and a temperature sensor 612. As described herein, the pressure sensor 608 may be a MEMS sensor. The velocity sensor 610 may be an ultrasonic based Doppler sensor.

In addition, the BHA sensors/actuators 604 may include an electromagnetic (EM) communication device 614, for example, used to communicate between mandrels. The EM communication device 614 may also be used for sensing the presence of water proximate to the BHA, for example, by detecting a decrease in signal-to-noise ratio at the receiving mandrel from the broadcasting mandrel. Further, in some embodiments, multiple antennas may be spaced around the mandrels providing directional determination of the water proximate to the BHA.

A steering actuator 616 may be a mud motor, hydraulic actuator, or other device used to redirect the drillbit. A communicator 618 may be included in the BHA 604 to allow communication with the surface. The communicator 618 may be based on mud pulse telemetry. In some embodiments, the drilling fluid is compressed gas. In these embodiments, the communicator 618 may not be present as the compressibility of the drilling fluid prevents communication through mud pulse telemetry. In other embodiments, the communicator 618 is a digital interface to a wireline or optical line coupled to equipment at the surface through the coiled tubing line.

The BHA sensors/actuators 604 are coupled to the controller 602 through a number of different sensor interfaces 606. For example, a sensor interface and power bus 620 may couple the pressure sensor 608, the velocity sensor 610, and the temperature sensor 612 to the controller 602. Further, the sensor interfaces 606 generally provide power to the individual sensors, such as from a battery or a power line to the surface.

The sensor interfaces 606 may include an electromagnetic (EM) interface and power system 622 that provides power for the EM communication device 614. The EM communication device 614 may be located in a last mandrel, e.g., farthest from the drillbit along the BHA, allowing the last mandrel to provide communication through the communicator 618 to the surface.

If present, the steering actuator 616 is powered by hydraulic lines or electric lines, for example, from the surface. In some embodiments, a steering control unit 624 provides the power or hydraulic actuation for the steering actuator 616. In other embodiments, the geo-steering is performed by other techniques, such as the inclusion of bent subs in the BHA. In yet other embodiments, the coiled tubing drilling apparatus is pulled from the wellbore to obtain log data from the controller 602, and determine the trajectory changes to make.

The controller 602 may be a separate unit mounted in the control shack 116 (FIG. 1), for example, as part of a programmable logic controller (PLC), a distributed control system (DCS), or another computer control unit used for controlling the drilling. In other embodiments, the controller 602 may be a virtual controller running on a processor in a DCS, on a virtual processor in a cloud server, or using other real or virtual processors. In one embodiment, the controller 602 is included in an instrument package attached to the BHA, for example, in a mandrel along with sensors. This embodiment may be used with gas as the drilling fluid, as communication to the surface may be limited. Further, embedding the controller 602 in the BHA may be used for LWD, in which the coiled tubing is pulled from the wellbore to retrieve the data.

The controller 602 includes a processor 626. The processor 626 may be a microprocessor, a multi-core processor, a multithreaded processor, an ultra-low-voltage processor, an embedded processor, or a virtual processor. In some embodiments, the processor 626 may be part of a system-on-a-chip (SoC) in which the processor 626 and the other components of the controller 602 are formed into a single integrated electronics package. In various embodiments, the processor 626 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used.

The processor 626 may communicate with other components of the controller 602 over a bus 628. The bus 628 may include any number of technologies, such as industry standard architecture (ISA), extended ISA (EISA), peripheral component interconnect (PCI), peripheral component interconnect extended (PCIx), PCI express (PCIe), or any number of other technologies. The bus 628 may be a proprietary bus, for example, used in an SoC based system. Other bus technologies may be used, in addition to, or instead of, the technologies above. For example, the interface systems may include I²C buses, serial peripheral interface (SPI) buses, Fieldbus, and the like.

The bus 628 may couple the processor 626 to a memory 630, such as RAM, ROM, and the like. In some embodiments, such as in PLCs and other process control units, the memory 630 is integrated with a data store 632 used for long-term storage of programs and data. The memory 630 includes any number of volatile and nonvolatile memory devices, such as volatile random-access memory (RAM), static random-access memory (SRAM), flash memory, and the like. In smaller devices, such as PLCs, the memory 630 may include registers associated with the processor 626 itself. The data store 632 is used for the persistent storage of information, such as data, applications, operating systems, and so forth. The data store 632 may be a nonvolatile RAM, a solid-state disk drive, or a flash drive, among others. In some embodiments, the data store 632 will include a hard disk drive, such as a micro hard disk drive, a regular hard disk drive, or an array of hard disk drives, for example, associated with a DCS or a cloud server.

The bus 628 couples the processor 626 to a sensor interface 634. The sensor interface 634 is a data interface that couples the controller 602 to the sensor interface and power bus 620. In some embodiments, the sensor interface 634 and the sensor interface and power bus 620 are combined into a single unit, such as in a universal serial bus (USB).

The bus 628 also couples the processor 626 to a controller interface 636. The controller interface 636 may be an interface to a plant bus, such as a Fieldbus, an I²C bus, an SPI bus, and the like. The controller interface 636 may provide the data interface to the electromagnetic interface and power system 622 and the steering control unit 624.

The bus 628 couples the processor 626 to a network interface controller (NIC) 638. The NIC 638 couples the controller 602 to the communicator 618, for example, if the controller 602 is located in the BHA 604.

The data store 632 includes a number of blocks of code that include instructions that, when executed, direct the processor to carry out the functions described herein. The data store 632 includes a code block 640 to instruct the processor to control communication, for example, between mandrels with the EM communication device 614, or between the controller and a surface device using the communication device 618.

The data store 632 includes a code block 642 to instruct the processor 626 to determine the signal-to-noise ratio of the communication received by the EM communication device. A code block 644 instructs the processor 626 to determine the distance to water proximate to the BHA. This may be performed by comparing the signal-to-noise ratio of communication performed over the EM communication device 614 to standards or trends. As described herein, at block 646, the trends in the distance to water are determined.

The data store 632 includes a code block 648 to instruct the processor 626 to determine adjustments to the steering vector based on the measurements, including the distance to water and other measurements, trends in the measurements, and geophysical data or models. A code block 650 may be included to direct the processor 626 to automatically make the adjustments to the steering vector, for example, if the drilling fluid is a gas that makes communication to the surface difficult by mud pulse telemetry.

The code blocks described above may be in different combinations of code to implement the functions described herein. Further, the data store 632 may include other code blocks to add additional functionality. For example, a code block may be included to instruct the processor to measure sensor responses, for example, from the pressure sensor 608, the velocity sensor 610, and the temperature sensor 612. A code block may be included to instruct the processor 626 to determine gas parameters from the measurements. As described herein, the gas parameters may include hydrocarbon content of flowing fluids, gas content in flowing fluids, flow velocity, and the like. The determination is made for each mandrel and a difference between the measurements for the mandrels is calculated. A code block may be included to instruct the processor 626 to determine trends in the gas parameters.

An embodiment described herein provides a method for geosteering in directional drilling. The method includes determining a signal-to-noise ratio (SNR) for an electromagnetic communication between devices on a bottom hole assembly, and determining a distance to water based, at least in part, on the SNR. Adjustments to geosteering vectors for the bottom hole assembly are determined based, at least in part, on the distance to water.

In an aspect, the electromagnetic communication is performed between instrumented mandrels on the bottom hole assembly.

In an aspect, the method includes determining a trend in the distance to water. In an aspect, the method includes determining the adjustments to the geosteering vectors for the bottom hole assembly based, at least in part, on the trend in the distance to water.

In an aspect, the method includes determining the adjustments to the geosteering vectors for the bottom hole assembly based, at least in part, on a geophysical model.

In an aspect, the method includes communicating measurements from a first mandrel to a second mandrel and logging the measurements in a data store in the second mandrel. In an aspect, the method includes transmitting the measurements to a surface facility from the second mandrel.

In an aspect, the method includes drilling a wellbore in an underbalanced condition using a coiled tubing drilling apparatus.

In an aspect, the method includes making the adjustments to the geosteering vectors to change a trajectory of a wellbore. In an aspect, the method includes making the adjustments to the geosteering vectors in a controller in the bottom hole assembly.

In an aspect, the method includes measuring temperature. In an aspect, the method includes measuring a hydrocarbon content in a two phase stream. In an aspect, the method includes measuring a gas content in a two-phase stream. In an aspect, the method includes measuring flow velocity. In an aspect, the method includes measuring pressure.

Another embodiment described herein provides a system for geosteering in directional drilling, comprising a bottom hole assembly. The bottom hole assembly includes a coiled tubing drilling apparatus and at least two mandrels mounted on the coiled tubing drilling apparatus, wherein each mandrel comprises an electromagnetic communication device. A controller is included to determine a distance to a water layer based, at least in part, on electromagnetic communications between the at least two mandrels. The system includes a drill bit.

In an aspect, the controller determines the distance based on a reflection of the electromagnetic communication from a water layer. In an aspect, the controller determines the distance based on a reflection of the electromagnetic communication from a water layer. In an aspect, the system includes a sealed surface system to allow the coiled tubing drilling apparatus to drill in an underbalanced configuration.

In an aspect, the system includes a pressure sensor. In an aspect, the system includes a velocity sensor. In an aspect, the system includes a temperature sensor. In an aspect, the system includes a conductivity probe. In an aspect, the system includes a mud pulse telemetry system.

In an aspect, the system includes a steering actuator to change a direction of the bottom hole assembly.

In an aspect, the controller includes a processor and a data store, wherein the data store comprises instructions that, when executed, direct the processor to determine a signal-to-noise ratio (SNR) for an electromagnetic communication between devices on a bottom hole assembly. The data store also comprises instructions that, when executed, direct the processor to determine a distance to water-based, at least in part, on the SNR, and determine adjustments to geosteering vectors for the bottom hole assembly based, at least in part, on the distance to water. In an aspect, the data store comprises instructions that, when executed, direct the processor to make adjustments to the geosteering vectors.

Other implementations are also within the scope of the following claims.

What is claimed is:

1. A method for geosteering in directional drilling, comprising:
    determining a signal-to-noise ratio (SNR) for an electromagnetic communication between devices on a bottom hole assembly;
    determining a distance to water based, at least in part, on the SNR;
    determining adjustments to geosteering vectors for the bottom hole assembly based, at least in part, on the distance to water; and
    making the adjustments to the geosphere vectors to change a trajectory of a wellbore.

2. The method of claim 1, wherein the electromagnetic communication is performed between instrumented mandrels on the bottom hole assembly.

3. The method of claim 1, further comprising determining a trend in the distance to water.

4. The method of claim 3, further comprising determining the adjustments to the geosteering vectors for the bottom hole assembly based, at least in part, on the trend in the distance to water.

5. The method of claim 1, further comprising determining the adjustments to the geosteering vectors for the bottom hole assembly based, at least in part, on a geophysical model.

6. The method of claim 1, further comprising:
    communicating measurements from a first mandrel to a second mandrel; and
    logging the measurements in a data store in the second mandrel.

7. The method of claim 6, further comprising transmitting the measurements to a surface facility from the second mandrel.

8. The method of claim 1, further comprising drilling the wellbore in an underbalanced condition using a coiled tubing drilling apparatus.

9. The method of claim 1, further comprising making the adjustments to the geosteering vectors in a controller in the bottom hole assembly.

10. The method of claim 1, further comprising measuring temperature.

11. The method of claim 1, further comprising measuring a hydrocarbon content in a two phase stream.

12. The method of claim 1, further comprising measuring a gas content in a two-phase stream.

13. The method of claim 1, further comprising measuring flow velocity.

14. The method of claim 1, further comprising measuring pressure.

15. A system for geosteering in directional drilling, comprising
    a drill bit coupled to a bottom hole assembly; and
    the bottom hole assembly comprising:
        a coiled tubing drilling apparatus;
        at least two mandrels mounted on the coiled tubing drilling apparatus, wherein each mandrel comprises an electromagnetic communication device;
        a controller, comprising:
            a processor; and
            a data store, wherein the data store comprises instructions that, when executed, direct the processor to:
                determine a signal-to-noise ratio (SNR) for an electromagnetic communication between devices on a bottom hole assembly;
                determine a distance to water based, at least in part, on the SNR; and
                determine adjustments to geosteering vectors for the bottom hole assembly based, at least in part, on the distance to water.

16. The system of claim 15, wherein the controller determines the distance based on a reflection of the electromagnetic communications from a water layer.

17. The system of claim 15, wherein the controller determines the distance based on a reflection of the electromagnetic communications from a water layer.

18. The system of claim 15, further comprising a sealed surface system to allow the coiled tubing drilling apparatus to drill in an underbalanced configuration.

19. The system of claim 15, further comprising a pressure sensor.

20. The system of claim 15, further comprising a velocity sensor.

21. The system of claim 15, further comprising a temperature sensor.

22. The system of claim 15, further comprising a conductivity probe.

23. The system of claim 15, further comprising a mud pulse telemetry system.

24. The system of claim 15, further comprising a steering actuator to change a direction of the bottom hole assembly.

25. The system of claim 15, wherein the data store comprises instructions that, when executed, direct the processor to make adjustments to the geosteering vectors.

* * * * *